(12) United States Patent
Johnson

(10) Patent No.: US 7,053,301 B2
(45) Date of Patent: May 30, 2006

(54) ELECTRICAL BOX EXTENSION

(75) Inventor: Steven J. Johnson, Gallen, MI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/918,734

(22) Filed: Aug. 16, 2004

(65) Prior Publication Data

US 2006/0032654 A1   Feb. 16, 2006

(51) Int. Cl.
*H01H 9/02* (2006.01)

(52) U.S. Cl. .............. 174/58; 174/60; 174/61; 174/63; 174/64; 220/3.3

(58) Field of Classification Search .......... 174/58, 174/60, 61, 62, 63, 64, 135, 54; 220/3.2, 220/3.7, 3.9, 3.3, 3.92; 248/906; 439/535
See application file for complete search history.

(56) References Cited

U.S. PATENT DOCUMENTS

| | | | |
|---|---|---|---|
| 2,378,861 A | 6/1945 | Peevey | |
| 2,989,206 A | 6/1961 | McAfee | |
| 3,590,137 A * | 6/1971 | Librandi | 174/58 |
| 3,955,701 A | 5/1976 | Fisch | |
| 4,927,039 A | 5/1990 | McNab | |
| 5,042,673 A | 8/1991 | McShane | |
| 5,975,323 A | 11/1999 | Turan | |
| 6,307,154 B1 | 10/2001 | Gretz | |
| 2003/0189043 A1 | 10/2003 | Wegner et al. | |
| 2004/0051648 A1 | 3/2004 | Hagarty et al. | |

* cited by examiner

*Primary Examiner*—Dhiru R. Patel
(74) *Attorney, Agent, or Firm*—Alfred N. Goodman; Mark S. Bicks

(57) ABSTRACT

An electrical box extension includes a base having a first edge, a second edge, an inner wall, and an outer wall. The inner wall defines an aperture. An annular flange is disposed on the inner wall. The flange has first and second support surfaces. A first receiving section is formed between the first edge and the upper support surface. A second receiving section is formed between the second edge and the second support surface. The extension is reversible for extending the electrical box in either a partially or fully extended position.

23 Claims, 4 Drawing Sheets

ELECTRICAL BOX EXTENSION

FIELD OF THE INVENTION

The present invention relates to an extension for an electrical box. The extension enables a conventional electrical box, having a fixed depth and thus limited application, to be used with ceilings or walls of various thicknesses up to one and a half inches. The extension is reversible for extending the electrical box to a partially extended position or a fully extended position.

BACKGROUND OF THE INVENTION

In new construction, electrical boxes are attached to supports prior to installing the surrounding wall or ceiling. Many electrical boxes are adapted to be attached to a joist, truss or other framing member. Wiring is run to the electrical box and housed within the electrical box. Once the electrical box is secured to the framing member and wired, the surrounding ceiling or wall is formed of drywall and painted. A tool, such as a drywall saw, is then used to cut an opening in the ceiling or wall proximate the electrical box. Then, an electrical fixture, such as a ceiling fan or luminary fixture, is attached to the electrical box.

In some instances, electrical boxes used to support electrical fixtures are the same depth as the depth of the drywall forming the finished surface. In other words, the thickness of the box enables the box to be flush with the finished surface upon installation. One-half inch drywall is the most popular ceiling or wall covering. Consequently, typical electrical boxes have a depth of one-half inch. However, there are cases where the thickness of the drywall must be varied in order to act as a sound barrier or to satisfy building code regulations for fire protection (e.g. hotels, apartments, etc.). In these cases, installers are limited to using products that are specific to the drywall thickness, or a product that can be extended.

Most electrical boxes do not have ways for easily extending or modifying their depth for use with varying ceiling or wall thicknesses. For example, U.S. Pat. No. 4,927,039 to McNab discloses an extender for an electrical box having bores in corner blocks of the extender for receiving fasteners to secure the extender to holes in the electrical box. U.S. Pat. No. 5,975,323 to Turan discloses an adjustable extender for an electrical box having spacers positioned between the extender and the electrical box to adjust the depth added to electrical box. U.S. Pat. No. 2,378,861 to Peevey and U.S. Pat. No. 2,989,206 to McAfee disclose outlet box extensions having removable scored sections to adjust the depth added to the electrical box. Fasteners secure the extension to the electrical box. Lastly, U.S. Published Patent Application Nos. 2003/0189043 to Wegner et al. and 2004/0051648 to Hagarty et al. disclose electrical box extensions that are secured to an outer surface of the electrical box with fasteners.

These patents and applications are directed to extensions intended for use primarily with fasteners. Moreover, these patents do not readily simplify the extension of an electrical box.

Thus, there is a continuing need to provide improved electrical box assemblies.

SUMMARY OF THE INVENTION

An object of the present invention is to provide an extension and method of assembling an extension with an electrical box which reduces the number of parts required, thus lowering inventory and storage costs.

Another object of the present invention is to provide an extension and method of assembling an extension with an electrical box without the aid of fasteners by utilizing an interference fit.

A further object of the present invention is to provide an extension which is simple and inexpensive to manufacture, and easy to assemble and use.

Yet another object of the present invention is to provide an extension and method of assembling an extension with an electrical box in either a partially or fully extendable position by making the extension reversible.

The foregoing objects are basically obtained by an extension adapted for use with an electrical box having a base including a first edge, a second edge, an inner wall, and an outer wall, the inner wall defining an aperture. A substantially annular shaped flange is disposed on the inner wall, the flange having first and second support surfaces. A first receiving section is formed between the first edge and the first support surface, and a second receiving section is formed between the second edge and the second support surface.

The foregoing objects are also obtained by an electrical box assembly with an electrical box including a side wall including an inner surface and outer surface. An extension having a base including a first edge, a second edge, an inner wall, and an outer wall, the inner wall defining an aperture. A flange disposed on one of the inner or outer walls having first and second support surfaces. The first receiving section is formed between the first edge and the first upper support surface, and a second receiving section is formed between the second edge and the second support surface, each receiving section having a different depth from one another. The extension is slidably engageable with the electrical box side wall for mounting the electrical box in either a partially extended position or a fully extended position.

The foregoing objects are additionally obtained by a method of mounting an electrical box extension, comprising the steps of determining a thickness of a ceiling or wall being installed. Connecting the electrical box to a support. Installing the ceiling or wall adjacent the support. Locating the electrical box in the ceiling or wall. Cutting an aperture in the ceiling or wall for exposing the electrical box. Positioning one of a first receiving section or a second receiving section of an extension contiguous to the electrical box depending upon the thickness of the ceiling or wall. Slidably attaching the one of a first receiving section or a second receiving section to the electrical box.

Other objects, advantages, and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 3:
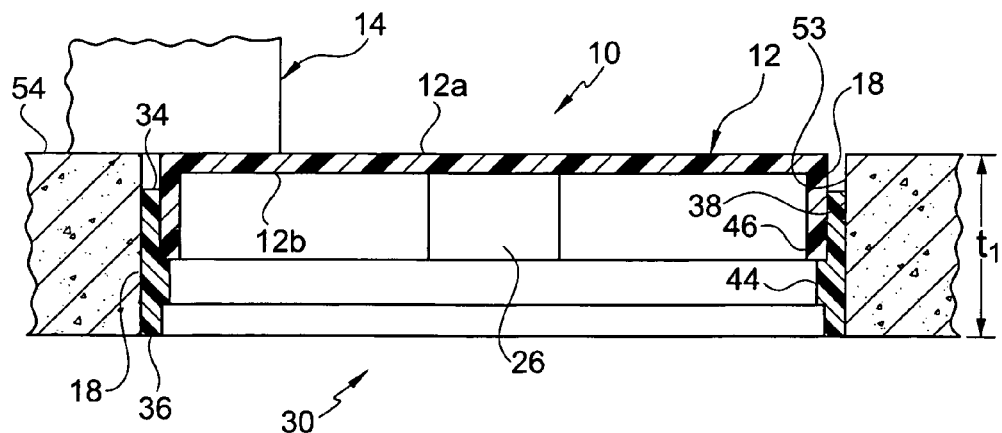
FIG. 3 is a side elevational view in longitudinal section of the extension of FIG. 1, with the electrical box received in the first receiving section in the extension and the box and extension located in a ceiling or wall.
Figure 4:
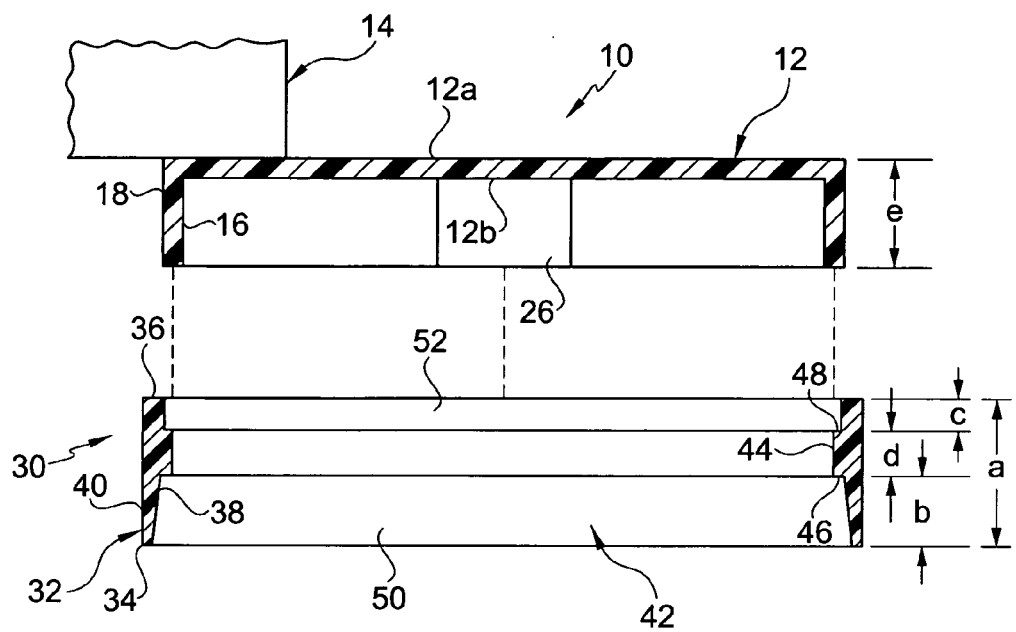
FIG. 4 is an exploded, side elevational view in longitudinal section of the extension and electrical box of FIG. 1, depicting the electrical box prior to insertion into the second receiving section in the extension.
Figure 5:
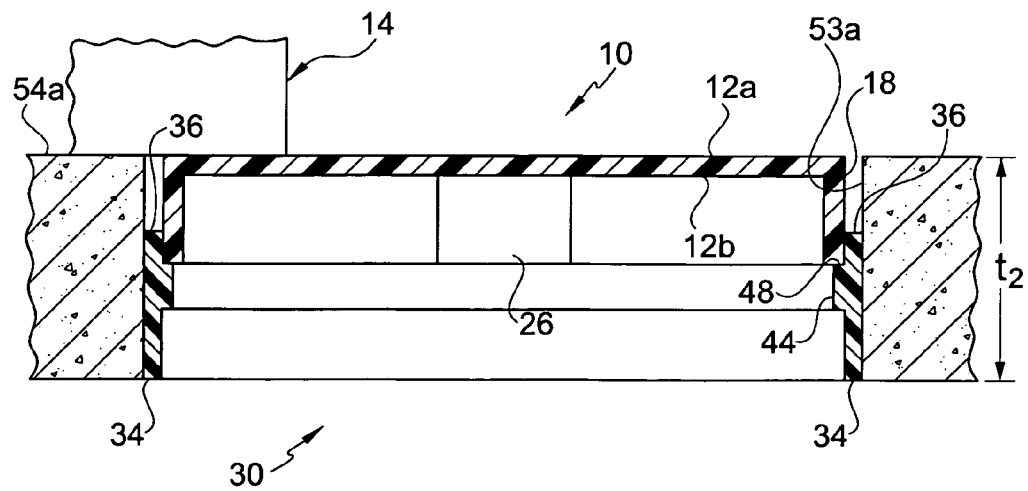
FIG. 5 is a side elevational view in longitudinal section of the extension of FIG. 1, with the electrical box received in the second receiving section in the extension and the box and extension located in a thicker ceiling or wall.

Referring initially to FIGS. 1–5, an electrical box extension 30 according to the present invention enables a conventional electrical box 10, having a fixed depth and thus limited in application, to be used with ceilings or walls of various thicknesses up to one and a half inches. The extension 30 is reversible for extending the electrical box 10 to a partially extended position (FIG. 3) or a fully extended position (FIG. 5).

The electrical box 10 includes a substantially circular base 12 having an upper surface 12a, a lower surface 12b, and a wiring chamber 14. The lower surface 12b has a first substantially cylindrical inner wall 16 extending substantially perpendicular therefrom. A second substantially cylindrical outer wall 18 extends substantially perpendicular from the upper surface 12a such that the first inner wall 16 and second outer wall 18 are substantially concentric to a centrally disposed axis of the base 12 defining an aperture 20 and a side wall therebetween. At least one opening 22 in the base 12 receives a first fastener (e.g. a wood screw) for securing the electrical box 10 to a support, such as a joist or truss. There are two openings 24,26 for receiving at least two second fasteners to secure an electrical fixture (not shown) to the electrical box 10. Preferably, the second fasteners 24,26 extend through the electrical box 10 into a truss or joist support to firmly secure the electrical fixture to the support. The electrical box 10 can be a ceiling box as disclosed in U.S. Pat. No. 6,722,621 to Johnson, the entire subject matter of which is hereby incorporated by reference. Preferably, the electrical fixture is a ceiling fan or luminaire. Moreover, preferably, the ceiling or wall is constructed of drywall 54, however, a suitable alternatives (e.g. plaster) may be used.

The extension 30 is adapted for use with the electrical box 10 and comprises a substantially cylindrical base 32 including a first end edge 34, a second end edge 36; an inner, substantially cylindrical, wall 38, and an outer substantially cylindrical wall 40. The inner wall 38 and outer wall 40 define an aperture 42. A substantially annular flange 44 is positioned on the inner wall 38 and includes a first, substantially annular support surface 46 and a second, substantially annular support surface 48. A first receiving section 50 is formed between and by the first edge 34 and the first support surface 46. A second receiving section 52 is formed between and by the second edge 36 and the second support surface 48.

The base 32 of extension 30 is generally constructed of metal or plastic and has a substantially uniform transverse cross section. The base 32 is preferably substantially annular, however, the base 32 may be formed of any polygonal or combination of polygonal shapes. The base 32 has a first or top edge 34 and a second or bottom edge 36. The first edge 34 and second edge 36 are substantially annular and extend in planes substantially parallel to one another. Each edge 34, 36 may be beveled and/or angled to facilitate engagement of the extension 30 with the electrical box 10.

The base 32 includes a substantially annular inner wall 38 and a substantially annular outer wall 40. The inner wall 38 establishes an interference fit with the outer wall 18 of the electrical box 10. The inner wall 38 and outer wall 40 are substantially concentric to the central axis of the base 32 and have generally smooth surfaces. The inner wall 38 and outer wall 40 extend continuously between the top edge 34 and the bottom edge 36 and define the central aperture 42. The aperture 42 is preferably substantially annular, however, the aperture 42 can be formed in the shaped of any polygon or combination of polygons.

The inner wall 38 or outer wall 40 can include notches for facilitating engagement with a specific electrical box. Moreover, ribs can also be provided along a surface of the inner wall 38 or outer wall 40 for providing structural strength to the body at known points of increased stress. The inner wall 38 or outer wall 40 may also be inwardly or outwardly tapered for facilitating the interference fit engagement with the electrical box 10.

The metal or plastic flange 44 is disposed on the inner wall 38. Preferably, the flange 44 has a substantially rectangular cross-section, however, the flange 32 can be of any polygonal shape or combination of polygonal shapes. The flange has a first mounting surface 46 and a second mounting surface 48. A substantially L-shaped engagement lip is formed between both the first mounting surface 46 and the second mounting surface 48 and the inner wall 38.

Preferably, the flange 44 continuously extends along the periphery of the inner wall 38; however, the flange 44 can be discontinuous and formed of spaced segments. The flange 44 can be integrally molded to the base 32 or can alternatively be connected utilizing conventional fasteners. Lastly, the first mounting surface 46 and/or the second mounting surface 48 can have locating grooves disposed thereon for facilitating positioning of the electrical box 10.

As best seen in FIGS. 3 and 5, a first receiving section 50 is formed between the first edge 34, the inner wall 38, and the first mounting surface 46. The first receiving section 50 is adapted for extending the electrical box 10 to a predetermined depth. A second receiving section 52 is formed between the second edge 36, the inner wall 38, and the second mounting surface 48. The depth of the first receiving section 50 is greater than that of the second receiving section 52.

Figure 1:
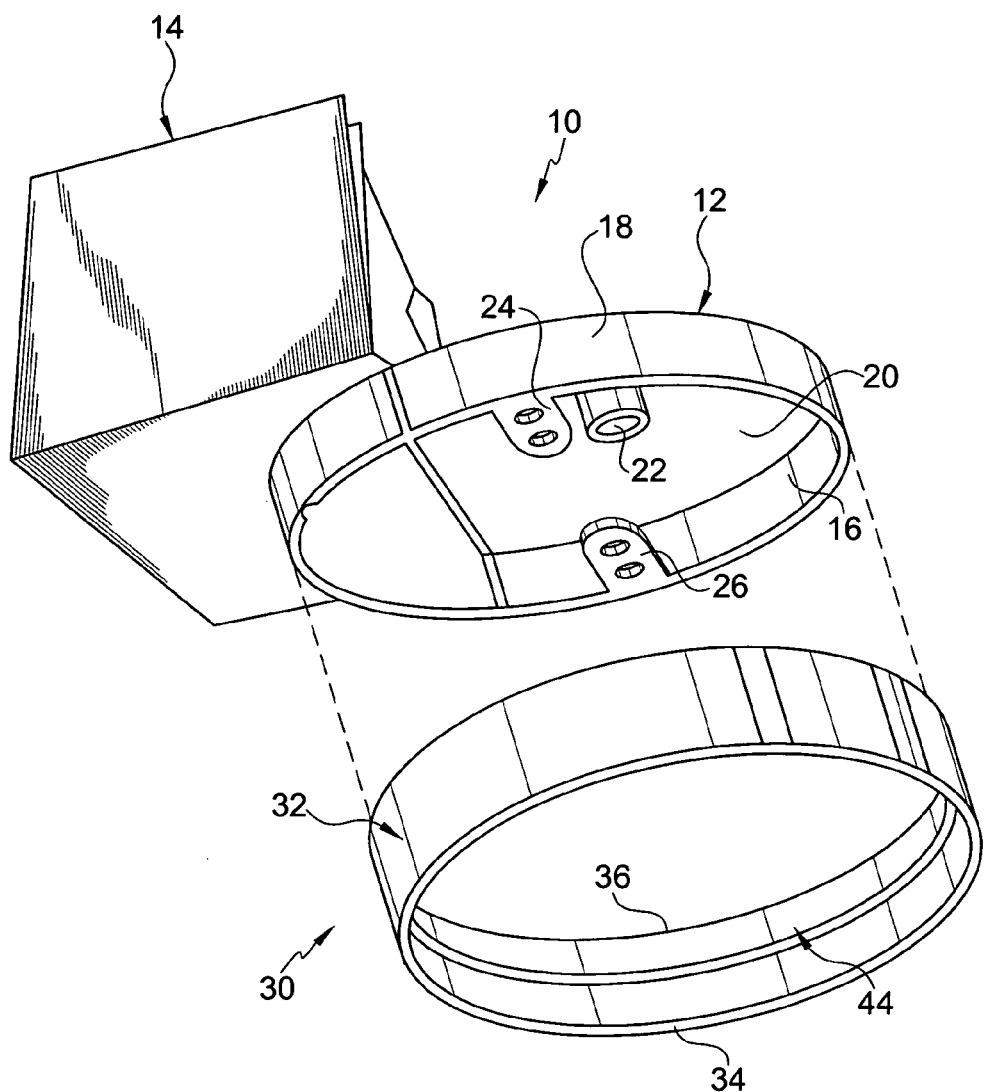
FIG. 1 is an exploded, bottom perspective view of an electrical box and extension according to the present invention.
Figure 2:
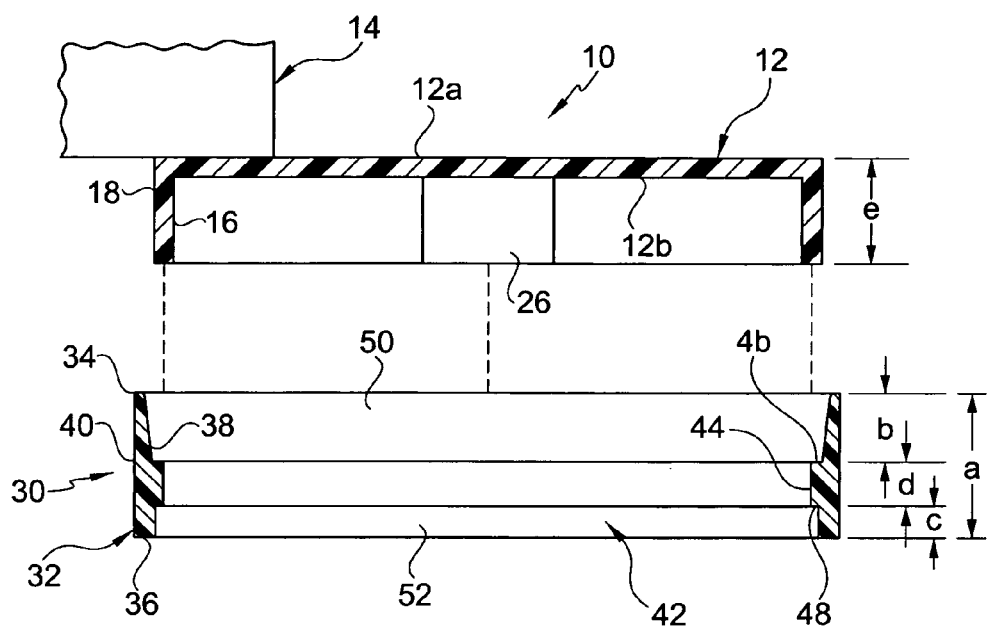
FIG. 2 is an exploded, side elevational view in longitudinal section of the extension and electrical box of FIG. 1, depicting the electrical box prior to insertion into a first receiving section in the extension.

As best seen in FIG. 3, the electrical box 10 is received in the first receiving section 50 and is partially extended to a distance $t_1$ ($t_1$=1.0 in). FIG. 2 also illustrates the length of individual components, a, b, c, d, and e. The components, a, b, c, d, and e correspond to substantially about the following lengths/depths in inches: a=1.0 in.; b=0.5 in.; c=0.25 in.; d=0.25 in.; e=0.5 in. Thus, when the electrical box 10 nests within the first receiving section 50, the electrical box 10 is extended 0.5 inches (c+d). Therefore, the electrical box 10 is extended to $t_1$ of about 1.0 inch. Preferably, the drywall 54 thickness will also be substantially about $t_1$ or 1.0 in. However, present electrical codes allow 0.25 in. of noncombustible drywall 54 materials to be exposed beyond the electrical box 10, so the drywall thickness 54 may also extend up to 0.25 inches beyond the extension 30, effectively extending the electrical box 10 to use with walls of about 1.25 inches in thickness.

As best seen in FIG. 5, the electrical box 10 is received in the second receiving section 52 and is fully extended to a distance $t_2$ ($t_2$=1.25 in). FIG. 4 also illustrates the length of individual components, a, b, c, d, and e. As noted above, the components, a, b, c, d, and e correspond to substantially about the following lengths/depths: a=1.0 in.; b=0.5 in.; c=0.25 inches; d=0.25 in.; e=0.5 in. Thus, when the electrical box 10 nests within the second receiving section 52, the electrical box 10 is extended about 0.75 inches (b+d). Therefore, the electrical box 10 is extended to a wall thickness $t_2$ of about 1.25 inches. Preferably, the drywall 54a thickness in FIG. 5 will also be substantially about $t_2$ or 1.25 inches. However, present electrical codes allow 0.25 in. of non-combustible drywall 54 materials to be exposed beyond the electrical box 10, so the drywall 54 thickness may also extend up to 0.25 inches beyond the extension 30, effectively extending the electrical box 10 to about 1.50 inches.

ASSEMBLY & OPERATION

The electrical box 10 and extension 30 can accommodate a range of drywall 54 thicknesses of up to substantially about 1.5 inches or more. The electrical box 10 is preferably installed using the following steps. First, the electrical box 10 is fastened onto at least one joist or truss utilizing a retaining screw. Electrical wires are then pulled through the electrical box 10 and positioned for attachment of the electrical fixture.

Once the electrical box 10 is in place, drywall 54 is installed for forming a continuous ceiling or wall over the electrical box 10. The electrical box 10 abuts the drywall 54. Thus, proximate the location of the electrical box 10, the drywall 54 bulges outwardly. The electrical box 10 is visible in the ceiling or wall by the bulge in the drywall 54. A conventional tool such as a router tool or saw is used to cut an opening 53 in the drywall 54 (alternatively, an aperture can be cut in the drywall prior to installation). The circumference of the electrical box 10 is used to guide the tool, thus defining a similarly shaped aperture in the drywall 54, which can be slightly larger than the outer circumference of the electrical box 10. Once the aperture is formed, the surrounding drywall 54 returns to a flat position, no longer under the pressure from the electrical box 10, and at least part of the box is received in the aperture. The electrical box 10 and associated wiring are now exposed. A ceiling or wall finish is then applied. If the installer had not done it before, the installer now determines the amount or thickness of drywall 54 being utilized. At this point, the extension 30 is placed into opening 53 in the drywall 54 or the opening 53a in the drywall 54a, and first receiving section 50 or the second receiving section 52 of the extension 30 are slidably attached to the outer wall 18 of the electrical box 10 through an interference fit depending on whether the partially extended position (FIG. 3) or fully extended position (FIG. 5) is desired. Lastly, the electrical fixture is attached and wired to the electrical box 10. Alternatively, rather than having the electrical box 10 abut the drywall 54, an aperture can be cut in the drywall 54 prior to the installation steps set forth above and the electrical box 10 can be received therein.

EMBODIMENT OF FIG. 6

Figure 6:
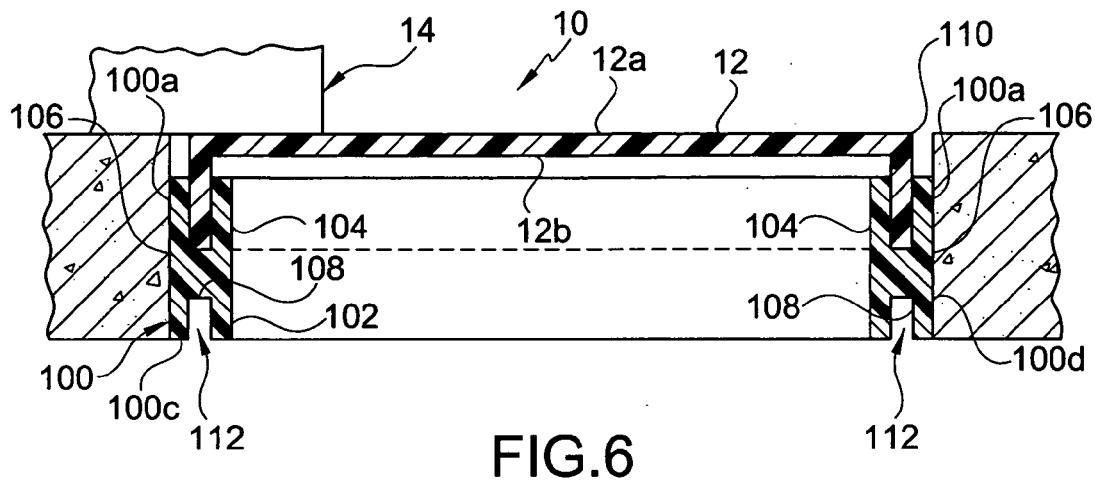
FIG. 6 is a side elevational view in longitudinal section of the extension according to a second embodiment of the invention engaging the inside and outside of the box.

An extension 100 according to a second embodiment of the invention is illustrated in FIG. 6. The extension 100 has a substantially H-shaped base 102 with first leg 100a, second leg 100b, third leg 100c, and fourth leg 100d. Each leg 100a–d has an inner wall 104 and an outer wall 106. Legs 100a–d are integrally connected to one another by a centrally disposed flange 108. A substantially U-shaped first receiving section 110 is formed between the first leg 100a and second leg 100b. A substantially U-shaped second receiving section 112 is formed between the third leg 100c and fourth leg 100d. The first receiving section 110 and the second receiving section 112 are formed on opposite sides of the centrally disposed flange 108. The first receiving section 110 has a greater depth then the depth of the second receiving section 112.

In this embodiment, as shown in FIG. 6, the side wall of the box 10 is received via an interference fit in one or the other of the U-shaped receiving sections 110 or 112 of the extension 100.

EMBODIMENT OF FIG. 7

Figure 7:
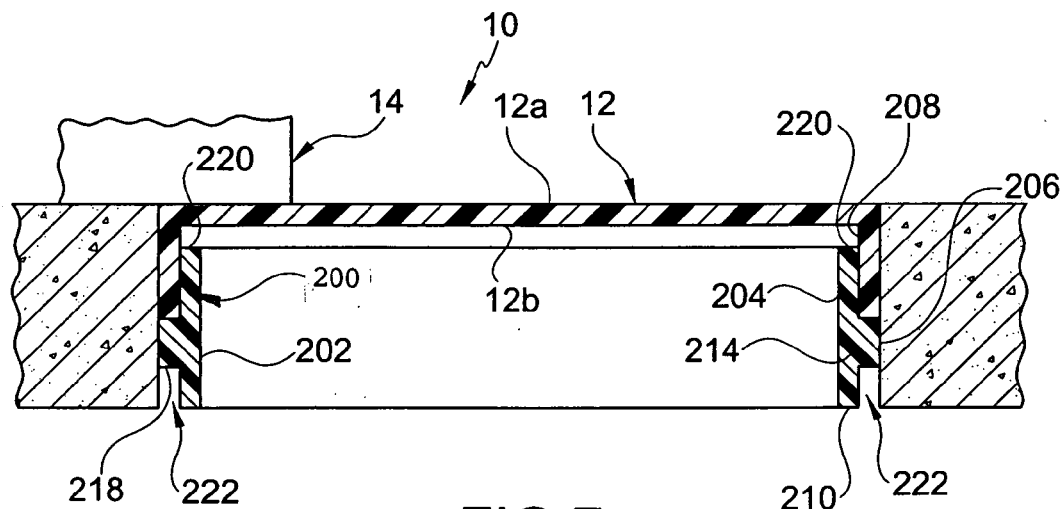
FIG. 7 is a side elevational view in longitudinal section of the extension according to a third embodiment of the invention engaging the inside of the box.

An extension 200 according to a third embodiment of the invention is illustrated in FIG. 7. The base 202 includes a substantially annular inner wall 204 and a substantially annular outer wall 206. The outer wall 206 establishes an interference fit with the inner wall 16 of the electrical box 10. The inner wall 204 and outer wall 206 are substantially concentric to the central axis of the base 202 and have generally smooth surfaces. The inner wall 204 and outer wall 206 extend continuously between the top edge 208 and the bottom edge 210 defining a central aperture 212. The aperture 212 is preferably substantially annular, however, the aperture 212 can be formed in the shaped of any polygon or combination of polygons.

A metal or plastic flange 214 is disposed on the outer wall 206. Preferably, the flange 214 is substantially rectangular in cross-section, however, the flange can be of any polygonal shape or combination of polygonal shapes. The flange 214 has a first mounting surface 216 and a second mounting surface 218. A substantially L-shaped engagement lip is formed between the first mounting surface 216 and second mounting surface 218 and the outer wall 206. A first receiving section 220 is formed between the flange 214 and the outer wall 206 having a first depth and a second receiving section 222 is formed between the flange 214 and the outer wall 206 having a second depth. The first depth is greater than the second depth.

In this embodiment, as shown in FIG. 7, the side wall of the box 10 is received via an interference fit on the outer wall 206 of the extension 200.

EMBODIMENT OF FIG. 8

Figure 8:
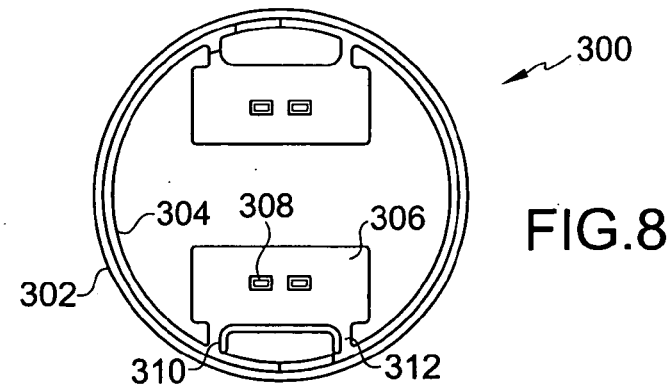
FIG. 8 is a top plan view of the extension according to a fourth embodiment of the invention carrying breakaway supports for extra fasteners.

An extension 300 having a base 302 according to a fourth embodiment of the invention is illustrated in FIG. 8. The extension 300 includes a fastener member 306 attached to a flange 304 of the extension 300. The fastener member 306 is preferably removably connected to base 302 by, for example, breaking or cutting the connection; however, fastener member 306 may alternatively be connected to flange 304 via fasteners or adhesive. The fastener member 306 is provided with a retainer member 308 (e.g., a fastener, clip, spring biased arms, etc.) for releasably holding longer fasteners for use with the extension 300. The fastener member 306 is preferably integrally connected to the flange 304 or base 302. At the connection arms 310, 312, the fastener member 306 will fatigue and break upon application of force, so that the user can easily remove the fastener member 306 from the extension 300 by hand.

While various embodiments have been chosen to illustrate the invention, it will be understood by those skilled in the art that various changes and modifications can be made therein without departing from the scope of the invention as defined in the appended claims.

What is claimed is:

1. An extension adapted for use with an electrical ceiling box, comprising:
   a base including a first edge, a second edge, an inner wall, and an outer wall, said inner wall defining an aperture;
   a substantially annular flange disposed on said inner wall, said flange having first and second support surfaces; and
   a first receiving section formed between said first edge and said first support surface, and a second receiving section formed between said second edge and said second support surface.

2. An extension according to claim 1, wherein said first receiving section and said second receiving section have different depths.

3. An extension according to claim 2, wherein the depth of said first receiving section is greater than the depth of said second receiving section.

4. An extension according to claim 1, wherein a fastener holder is removably connected to said flange.

5. An extension according to claim 1, wherein a fastener holder is removably connected to said base.

6. An extension according to claim 1, wherein said base is substantially annular.

7. An extension according to claim 1, wherein said base has a substantially uniform transverse cross section along an entire length thereof.

8. An extension according to claim 1, wherein said base and said flange are integrally connected.

9. An extension according to claim 1, wherein said base and said flange are made of a polymeric material.

10. An electrical box assembly, comprising:
    a electrical box having a side wall including an inner surface and outer surface;
    an extension having a base including a first edge, a second edge, an inner wall, and an outer wall, said inner wall defining an aperture;
    a flange disposed on one of said inner or outer walls having first and second support surfaces; and
    a first receiving section formed between said first edge and first support surface, and a second receiving section formed between said second edge and said second support surface, each receiving section having a different depth from one another, and being slidably engageable with at least one surface of said electrical box for mounting said electrical box in either a partially extended position or a fully extended position.

11. An extension ring according to claim 10, wherein the depth of said first receiving section is greater than the depth of said second receiving section.

12. An extension ring according to claim 10, wherein the at least one surface of the electrical box is an outer surface.

13. An extension ring according to claim 10, wherein the at least one surface of the electrical box is an inner surface.

14. An extension ring according to claim 10, wherein the at least one surface of the electrical box comprises both the inner surface and the outer surface.

15. An extension ring according to claim 10, wherein a fastener holder is removably connected to said flange.

16. An extension ring according to claim 10, wherein a fastener holder is removably connected to said base.

17. An extension ring according to claim 10, wherein said base and said flange are substantially annular.

18. An extension ring according to claim 10, wherein said base has a substantially uniform transverse cross section along an entire length thereof.

19. An extension ring according to claim 10, wherein said base and said flange are integrally connected.

20. An extension ring according to claim 10, wherein said base and said flange are made of a polymeric material.

21. A method of mounting an electrical box extension, comprising the steps of
    connecting an electrical box to a support;
    installing a ceiling or wall adjacent the support;
    locating the electrical box in the ceiling or wall;
    cutting an aperture in the ceiling or wall for exposing the electrical box;
    positioning one of a first receiving section or a second receiving section of an extension contiguous to the electrical box depending upon a thickness of the ceiling or wall, the first and second receiving sections having a different depth from one another;
    slidably attaching the one of a first receiving section or a second receiving section to at least one surface of the electrical box in either a partially extended or a fully extended position,
    the extension having a flange defining the inner ends of each of the first and second receiving sections and being spaced from the outer ends of each of the first and second receiving sections.

22. A method of mounting an electrical box extension according to claim 21, and further comprising the steps of attaching an electrical fixture to the electrical box.

23. A method of mounting an electrical box extension according to claim 21, wherein the ceiling or wall is comprised of drywall.

* * * * *